3,850,991
SULPHONES WITH 1,6-DIMETHYL-
HEXA-1,5-DIENYLENE CHAIN
Pierre Chabardes, Lyon, Marc Julia, Paris, and Albert
Menet, La Mulatiere, France, assignors to Rhone-
Poulenc S.A., Paris, France
No Drawing. Filed Feb. 1, 1973, Ser. No. 328,624
Claims priority, application France, Feb. 2, 1972,
7203483; Apr. 10, 1972, 7212478
Int. Cl. C07c 147/04
U.S. Cl. 260—607 A
14 Claims

ABSTRACT OF THE DISCLOSURE

Sulphones useful for preparing polyenes have the formula:

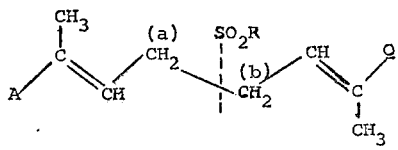

where the sulphonyl group replaces a hydrogen atom on carbon atom (a) or (b), R represents alkyl, aralkyl or aryl, optionally substituted, A and Q represent an optionally substituted hydrocarbon of $5n+1$ carbon atoms ($n$ is 1–5), methyl optionally substituted by halogen, sulphide or sulphone, $CH_2OH$ (or an ether or ester thereof), CHO (optionally protected), COOH (or an acid chloride, ester or nitrile thereof), with the proviso that Q is different from A when A represents a 6-(2,6,6-trimethylcyclohex - 1 - enyl) - 4-methylhexa-1,3,5-trienyl radical.

---

This invention relates to sulphones with a 1,6-dimethylhexa-1,5-dienylene chain and to their applications as intermediates in organic synthesis.

The present invention provides a sulphone corresponding to the general formula:

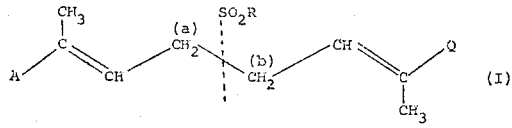

in which the sulphonyl group —$SO_2R$ replaces a hydrogen atom on carbon atom (a) or (b), R represents an alkyl, aralkyl or aryl radical, each of which is substituted or unsubstituted, each of A and Q, which may be the same or different represents (a) a hydrocarbon radical containing $5n+1$ carbon atoms ($n$ being an integer of 1 to 5), which is substituted or unsubstituted, (b) A methyl radical, which is unsubstituted or substituted by a halogen e.g. chlorine or bromine or by a —SR' or —$SO_2R'$ group in which R' represents an alkyl, aralkyl or aryl radical, each of which is substituted or unsubstituted, (c) A primary alcohol group —$CH_2OH$, an ether group thereof e.g. an alkyl ether with preferably 1 to 6 carbon atoms or an ester group which it forms with an inorganic or organic acid e.g. an alkanoic acid with preferably 1 to 6 carbon atoms, (d) A free or protected aldehyde group, (e) An acid group —COOH, its acid chloride group, an ester thereof e.g. an alkyl ester of preferably 1 to 6 carbon atoms or a nitrile group, with the proviso that Q and A are not both 6-(2,6,6-trimethylcyclohex-1-enyl)-4-methyl-hexa-1,3,5-trienyl radicals.

carbon atoms, this radical can be saturated or unsaturated with conjugated and/or unconjugated ethylenic unsaturation. It can possess functional groups or it can be substituted by alkyl groups; when $n$ is 2 to 5, this radical can contain a ring to which alkyl groups and/or functional groups such as O= or —OH may be attached, these functional groups being free or protected.

Q represents a methyl radical, which may optionally be substituted by a halogen, or a —SR' or —$SO_2R'$ group in which R' corresponds to the definition given above for R and can be identical to or different from the latter.

Q can also represent:

a primary alcohol group —$CH_2OH$, the ethers corresponding to this group or the esters which it forms with inorganic or organic acids, a free or protected aldehyde group, an acid group —COOH, its acid chloride, its esters or the corresponding nitrile or a hydrocarbon radical which corresponds to the definition given above for A but which can be identical to or different from the latter; Q is different from A when the latter represents a 6-(2,6,6 - trimethyl-cyclohex-1-enyl)-4-methylhexa-1,3,5-trienyl radical.

R and R' preferably represent aryl radicals, e.g. aromatic hydrocarbon radicals (such as phenyl radicals) which may optionally be substituted e.g. by chlorine or alkyl of preferably 1 to 4 carbon atoms.

The hydrocarbon radicals represented by A and Q preferably represent a group having a carbon skeleton of formula

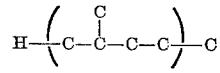

wherein $n$ is 1–5, each $C_5$ unit containing 0–2 ethylenic double bonds, the remaining valencies being satisfied by hydrogen atoms, or two adjacent $C_5$ units are joined to form a structure containing a ring of 6 ring carbon atoms, which can be substituted by a hydroxy or oxo group, or by a methyl group additional to the methyl substituents forming part of the carbon skeleton of $C_5$ units, and the chain of $C_5$ units can have one substituent of formula $SO_2R$, wherein R is as defined above in a grouping

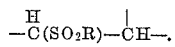

The ring is usually a 2,6,6-trimethylcyclohex-1-enyl ring.

Important examples of radicals represented by A are a 6 - (2,6,6 - trimethylcyclohex - 1 - enyl) - 4 - methylhexa-1,3,5-trienyl radical or a 6-(2,6,6-trimethylcyclohex - 1 - enyl) - 4 - methyl - 2 - phenylsulphonyl-hexa-3,5-dienyl radical, a 2 - (2,6,6 - trimethylcyclohex - 1-enyl)-ethenyl radical or a methyl radical.

Q preferably represents a methyl or halogenated methyl radical or a $CH_2OH$ group, an ester or ether group thereof, a —CHO group and acetal group thereof, or a —COOH group, acid chloride or ester group thereof or nitrile group, or a sulphone group of formula —$CH_2SO_2R'$, wherein R' is as defined above. Q can also preferably represent a polyene radical containing a 2,6,6-trimethylcyclohexene ring, for example a radical as listed as preferred for A above.

The present invention provides a process for preparing a sulphone of formula I which comprises reacting a compound of the formula $A—C(CH_3)=CH—CH_2X$ with a compound of the formula

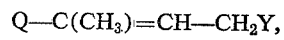

one of X and Y representing a halogen and the other an $SO_2R$ group in the presence of a basic agent capable of converting the compound in which X or Y represents an $SO_2R$ group into an anion, A, Q and R being as defined above. This process has two embodiments.

The first embodiment is a process for the preparation of the sulphone of formula I in which the sulphonyl group replaces a hydrogen atom on carbon (a), which comprises reacting a sulphone of the formula

A—C(CH₃)=CH—CH₂SO₂R (II)

with a halide of the formula

Q—C(CH₃)=CH—CH₂X, in the presence of a basic agent capable of converting the sulphone (II) into its anion, A, Q and R being as defined above and X representing a halogen atom, particularly chlorine or bromine. An equation for the reaction can be given as follows:

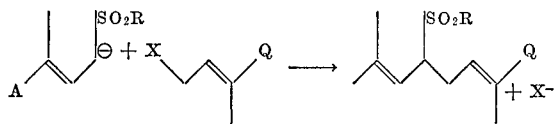

In the second embodiment of the process a halide of the formula A—C(CH₃)=CH—CH₂X and a sulphone Q—C(CH₃)=CH—CH₂SO₂R are reacted together in the presence of the basic agent to form a sulphone of formula I in which the group —SO₂R replaces a hydrogen atom on carbon atom (b).

The reaction is carried out in the presence of a basic agent which possesses sufficient activity to convert the sulphone employed into an anion. The basic agents which are suitable are inorganic or organic compounds, examples of which are alkali metal alcoholates, alkali metal hydrides or amides and organometallic compounds such as organo-zinc compounds, organo-lithium compounds and organo-magnesium compounds. They can be used alone or in conjunction with another basic agent intended to neutralise the hydrohalic acid formed. When the basic agent is used alone, the amount employed must be sufficient to achieve this neutralisation. The amount used also depends on how the reaction is carried out and on reactivity of the reaction products with respect to this basic agent. For these various reasons, it can be advantageous to employ a smaller amount of basic agent for the reaction and to add another basic agent, towards which the reaction products are less sensitive, in an amount such that together the basic agents are sufficient to neutralise the hydrohalic acid formed.

The reaction can be carried out at temperatures, which can range from —100° C. to +150° C., depending on the nature of the products employed and produced.

In order that the reaction can take place satisfactorily, it is advantageous to carry it out in an organic solvent which can be a hydrocarbon such as hexane, benzene or toluene, aprotic solvent, e.g. methanol and ethylene glycol, or a linear or cyclic ether of a monoalcohol or of a diol such as diethyl ether, dioxane or tetrahydrofuran. Other solvents such as dimethylformamide, dimethylacetamide, dimethylsulphoxide, N-methylpyrrolidone and hexamethylphosphotriamide are also suitable.

In certain cases e.g. when A or Q represents a CH₂SO₂R' group, wherein R' is as defined above, it is possible to replace the halogen derivative which reacts with the sulphone by a compound which possesses a terminal conjugated diene chain. The present invention also provides a process for preparing a sulphone of formula I, which comprises reacting a compound of the formula DH—C(CH₃)=CH—CH₂SO₂R with a compound of the formula D=C(CH₃)—CH=CH₂ in the presence of an alkaline agent, D representing A' or Q', Q' and A' being divalent radicals such that Q'H and A'H correspond to Q and A respectively, A, Q and R being as defined above. This process has two embodiments. In the first embodiment a compound of the formula

Q'=C(CH₃)—CH=CH₂ in which Q' represents a divalent radical such that Q'H corresponds to Q as defined above is reacted with a compound of formula II. The reaction is then represented by the equation

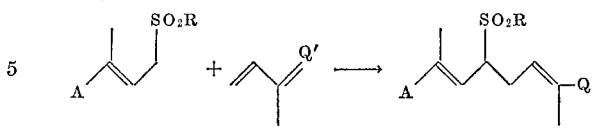

It gives rise to the formation of a product with the sulphone group on carbon atom (a) identical to that obtained by reacting the same sulphone with a halogenated compound Q—C(CH₃)=CH—CH₂X.

In the second embodiment, a sulphone of the formula Q—C(CH₃)=CH—CH₂—SO₂R is reacted with a diene compound A'=C(CH₃)—CH=CH₂, in which A' represents a divalent radical such that A'H corresponds to A to obtain a compound of formula I in which the sulphone group replaces a hydrogen atom on carbon atom (b).

In both cases, the reaction is carried out in the presence of an inorganic or organic alkaline agent such as an alkali metal hydroxide or alcoholate, an amine such as diethylamine, diisopropylamine, pyridine, triethylamine orf tributylamine, or a quaternary ammonium hydroxide. The reaction can be carried out in a solvent or in the absence of a solvent but it is however preferable to choose a solvent so that the reaction takes place in a homogeneous phase. This solvent can be an alcohol such as methanol, ethanol or tertiary butyl alcohol or an ether such as diethyl ether, dioxane or tetrahydrofuran or any other inert solvent such as benzene, toluene, dimethylformamide, or acetonitrile.

The reaction takes place at ambient temperature and where the reaction products are not affected by heating, it is possible to accelerate the reaction by carrying it out at a higher temperature. If the products of the reaction are sensitive to heat, it is possible to carry out the reaction at temperatures below ambient temperature. A description of all of the working conditions relating to the Michael reaction is found in "Organic Reactions, vol. 10, pp. 264–266—he Michael Reaction," of which this variant is an application.

The sulphones used in the preparation of the products of the formula (I) are known products or new products. They are generally obtained by reacting an alkali metal sulphinate of the formula RSO₂M, M representing an alkali metal, with a halogenated compound according to a usual method for the preparation of sulphones. In the case of those which are employed in the following Examples, their preparation is given in the Examples.

Compounds of formula A—C(CH₃=CH—CH₂SO₂R and Q—C(CH₃)=CH—CH₂SO₂R wherein A and Q represent a 2-(2,6,6-trimethylcyclohex-1-enyl)ethylene group are described and claimed in our U.S. Ser. No. 218,838 filed Jan. 18, 1972 by Marc Julia now U.S. Pat. No. 3,781,313. They may be prepared by reacting an alkali metal sulphinate of formula RSO₂M, wherein R and M are as defined above with either a compound of formula A—C(CH₃)=CH—CH₂X or Q—C(CH₃)=CH—CH₂X, wherein X represents chlorine, bromine or iodine, obtained by halogenation of vinyl-β-ionol with a phosphorus trihalide, or with vinyl-β-ionol itself.

Compounds of formula A—C(CH₃)=CH—CH₂SO₂R and Q—C(CH₃)=CH—CH₂SO₂R wherein A and Q represent a group —CH₂X or CH₂SO₂R, where X represents a halogen, are described and claimed in U.S. Ser. No. 328,600 filed Feb. 1, 1973 by Albert Menet. They may be prepared by reacting an alkali metal sulphinate of formula RSO₂M with a 1,4-dihalogeno-2-methylbut-2-ene, or when A or Q represents a group CH₂SO₂R, with a compound of formula X—C(CH₃)=CH—CH₂SO₂R where X represents a halogen.

Compounds of formula A—C(CH₃)=CH—CH₂SO₂R and Q—C(CH₃)=CH—CH₂SO₂R, wherein A and Q represent a group CH₂OR₁ where R₁ represents an alkyl or aryl group which may be substituted, are described and claimed in U.S. Ser. No. 328,611 filed Feb. 1, 1973 by Albert Menet. They may be prepared by reacting an alkali metal compound of formula $R_1OM$ with a 4-alkyl- (or aryl) sulphonyl-2-methyl-but-2-enyl halide.

Compounds of formula

or Q—C(CH₃)=CH—CH₂—SO₂R in which A or Q represents a 6-(2,6,6-trimethylcyclohex-1-enyl)4-methylhexa-1,3,5-trienyl radical are described and claimed in U.S. Ser. No. 254,103 filed May 17, 1972 in the name of Pierre Chabardes and Marc Julia now U.S. Pat. No. 3,803,252. They may be prepared by reacting an alkali metal sulphinate with retinol or a retinol ester of an inorganic or organic acid e.g. retinyl chloride, or with 3-retinol.

Retinyl halides, which are known compounds are preferably prepared by a process comprising reacting 1- (or 3) retinol with a halogenating reagent (e.g. phosphorus trichloride or tribromide) at a low temperature and in an inert solvent. This process is described and claimed in U.S. Ser. No. 254,102 filed May 17, 1972 in the name of Pierre Chabardes and now abandoned.

The halides are products the majority of which are well known, and specific details of their preparation are also given in the Examples. The compounds with a terminal conjugated diene group employed in the variant of the process can also be obtained, for example, by dehydrochlorination of a chlorinated compound by means of an alkaline agent.

The sulphones of the formula (I) are used for the preparation of known carotenoid compounds and more generally for the preparation of any terpene compound which contains a tail-to-tail diisoprene chain, and polyisoprene compounds of various degrees of saturation, optionally with one or more functional groups on the chain or at its ends. In order to carry out these preparations, these sulphones can be subjected to a suitable reduction treatment, e.g. with lithium and ethylamine and compounds containing the chain

characteristic of dihydrocarotenes, for example, 15,15'-dihydro-β-carotene, lycopersene and squalene, are then obtained. It is also possible to carry out the desulphonation by treatment with an inorganic or organic basic agent such as an alkali metal hydroxide, an alkali metal carbonate or an alkali metal alcoholate, and compounds containing the conjugated triene chain

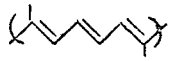

are obtained. Desulphonation of any

group in the rest of the sulphone of formula I usually occurs with the reduction or elimination from carbon atoms (a) and (b). Examples of the trienes are lycopene and α-, β- and γ-carotene (all naturally occurring colourants) and their conjugated and/or unconjugated polyolefinic hydrocarbon homologues such as phytorene, phytofluorene and neurosporene. Examples of the compounds with functional groups attached are xanthophyll derivatives of the various carotenes such as canthaxanthine, zeaxanthine, isozeaxanthine, echineone, lycoxanthine, and lycoxanthophyll. The apocarotenals with various numbers of carbon atoms in the molecule, their acids, their esters and their nitriles can also be prepared from the sulphones of formula I. Other examples of the functional compounds with a smaller number of carbon atoms in the molecule than that of the higher carotenes and which can be used as a base for preparing the latter are 2,7-dimethyl - octa - 2,4,6 - triene-1,8-dial or $C_{10}$-dialdehyde, the corresponding monoacids and diacids and their esters; crocetin dialdehydes or diacids and the esters of these diacids. Such difunctional compounds, which possess a tail-to-tail diisoprene chain, are used for synthesising carotenoids by condensation with various reagents, depending on the number of carbon atoms by which it is desired to increase their chain. An account of all the various synthetic routes which are possible with these compounds is given in J. Wiley & Sons—Interscience Publishers, Advances in Organic Chemistry—Methods and Results—volume 4 (1963) pages 115–211. This article also mentions numerous compounds containing one of the diene or triene chains mentioned above, which can be prepared with the sulphones of the invention.

The desulphonation can be carried out on the sulphone, after it has been isolated from the reaction medium or it can be carried out in this medium. Whatever the method chosen, an alkali metal sulphinate or a sulphinic acid is liberated and can be re-used in the preparation of the starting sulphone, so that, since these sulphones are intermediates in the synthesis of the polyisoprene compounds, the synthesis consumes practically no alkali metal sulphinate.

The following examples illustrate the preparation of sulphones according to the invention and their application in organic synthesis.

EXAMPLE 1

1.22 g. of potassium t-butylate and 6 cm.³ of tetrahydrofuran are introduced into a 100 cm.³ three-necked flask equipped with a dropping funnel, a reflux condenser and a mechanical stirrer. The mixture is cooled to −73° C. under a stream of argon and a solution of 1.53 g. of 1,4-dichloro-2-methyl-2-butane (1.1×10⁻² mol) in 5 cm.³ of tetrahydrofuran is run in. The mixture is kept at this temperature and a solution of 1.72 g. of phenyl-5-(2,6,6-trimethyl-cyclohex-1-enyl)-3-methyl - penta - 2,4 - dienyl-sulphone (5×10⁻³ mol) in 6 cm.³ of tetrahydrofuran is run in slowly. The mixture is left at this temperature for 4 hours and is then allowed to rise to −30° C. over the course of 2 hours. The reaction mixture is poured into a mixture of 200 cm.³ of water and 100 cm.³ of diethyl ether and the resultant mixture is then decanted. The aqueous layer is extracted with 3 times 50 cm.³ of diethyl ether. The combined ether layers are washed with water, dried over magnesium sulphate, filtered and concentrated. 3.5 g. of a viscous oil are obtained in which a compound corresponding to the formula:

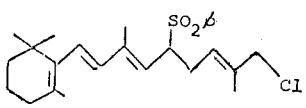

is identified and measured by nuclear magnetic resonance. 90% yield relative to the sulphone employed.

Phenyl-5-(2,6,6-trimethyl-cyclohex - 1 - enyl)-3-methyl-penta-2,4-dienyl-sulphone was prepared by reacting an alkali metal phenylsulphinate with 1-chloro-3-methyl-5-(2,6,6-trimethyl-cyclohex - 1 - enyl)-penta-2,4-diene according to the process described in U.S. Ser. No. 218,838 filed Jan. 18, 1972 by Marc Julia.

EXAMPLE 2

3.68 g. of potassium t-butylate and 5 cm.³ of tetrahydrofuran are introduced into a 50 cm.³ three-necked flask equipped with a mechanical stirrer, a reflux condenser, a dropping funnel and a nitrogen inlet. A solution of 4.1 g. (1×10⁻² mol) of phenyl-retinyl-sulphone in 10 cm.³ of tetrahydrofuran is introduced, at −70° C., under nitrogen. A solution of 2.78 g. (2×10⁻² mol) of 1,4-dichloro-2-methyl-2-butene in 4 cm.³ of tetrahydrofuran is then run in. The mixture is kept at −70° C. for 5 hours. The reaction mixture is then decanted and treated as in the preceding example. 7.15 g. of a red viscous oil are thus obtained in which 5 g. of a sulphone chloride corresponding to the formula:

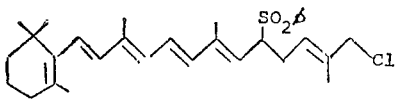

are identified and measured by U.V. spectrography and nuclear magnetic resonance.

Yield: 97.5% of the sulphone employed.

Preparation of phenyl-retinyl-sulphone: 1.43 g. of 9-(2,6,6-trimethyl-cyclohex-1-enyl) - 3,7 - dimethyl-nona-1,4,6,8-tetraen-3-ol or 3-retinol dissolved in 3 cm.³ of diethyl ether are added to a solution of 1.06 g. of sodium phenylsulphinate in 100 cm.³ of acetic acid. The reaction mixture is left to stand for several hours and is then poured into 60 cm.³ of water. The aqueous layer is extracted with 4 times 10 cm.³ of diethyl ether. The ether layers are washed with an aqueous solution of sodium bicarbonate and then dried over magnesium sulphate. On evaporation of the ether, phenyl-retinyl-sulphone is obtained.

EXAMPLE 3

2 g. of phenyl-retinyl-sulphone dissolved in 10 cm.³ of tetrahydrofuran are run into a solution of 1.12 g. of potassium t-butylate in 12 cm.³ of tetrahydrofuran which has previously been cooled to —73° C., in an apparatus identical to that of Example 1. A solution of 1.12 g. of 4-chloro-2-methyl-1-t-butoxy-2-butene in 8 cm.³ of tetrahydrofuran is then added. The mixture is kept at —71° C. for 15 hours and then at —50° C. for 3 hours 45 minutes. The reaction mixture is then poured into a mixture of 100 cm.³ of water and 100 cm.³ of diethyl ether. After decanting and extracting the aqueous layer with diethyl ether and then treating the ether layers in accordance with Example 1, 4.1 g. of an orange-red viscous product are obtained, from which a product corresponding to the formula:

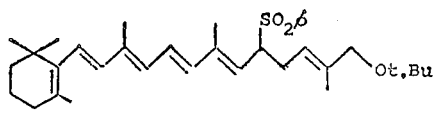

is isolated by thin layer chromatography.

Yield: 80% relative to the sulphone employed.

EXAMPLE 4

A solution of 2.05 g. of phenyl-retinyl-sulphone in 6 cm.³ of tetrahydrofuran is run into a flask containing 1.88 g. of potassium t-butylate and 3 cm.³ of tetrahydrofuran, which has been cooled to —25° C. A solution of 1.22 g. of phenyl - 4 - chloro-2-methyl-but-2-enyl-sulphone in 5 cm.³ of tetrahydrofuran is then added slowly (10 minutes). The temperature is allowed to rise to —15° C. and is kept at this value for 7 hours 30 minutes, whilst stirring. After standing for 16 hours at —70° C., the reaction mixture is poured into a mixture of 80 cm.³ of water and 50 cm.³ of diethyl ether and is then treated as in the preceding examples. 3.6 g. of a yellow solid product are obtained, which contain 2.16 g. of a product corresponding to the formula:

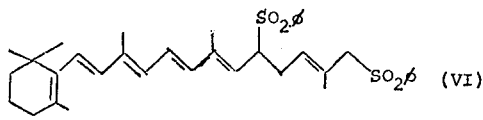

Yield: 70% relative to the sulphone employed.

4-Chloro-2-methyl-but - 2 - enyl-phenyl-sulphone was prepared by reacting phenylsulphonic acid chloride with isoprene according to the process described in French Pat. No. 1,409,516.

When this disulphone of the formula VI is reacted with 5-(2,6,6 - trimethyl - cyclohex-1-enyl)-3-methyl-1-chloro-penta-2,4-diene, in the presence of a basic agent capable of converting the disulphone into an anion, 12,15'-bis- (phenylsulphonyl)-β-carotene is produced which, on desulphonation in an alkaline medium, yields β-carotene.

EXAMPLE 5

(a) A solution of a disulphone of the formula:

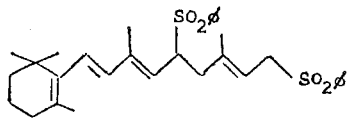

in 15 cm.³ of tetrahydrofuran, followed by a solution of retinyl chloride in tetrahydrofuran, the preparation of this solution being indicated below, is run into a flask which has been cooled to —30° C. and contains 4 g. of potassium t-butylate and 15 cm.³ of tetrahydrofuran. The reaction mixture is stirred for 2 hours at —30° C. and then for 4 hours at —15° C. and is left to stand for 16 hours at 0° C. The reaction mixture is poured into a mixture of 100 cm.³ of iced water and 50 cm.³ of diethyl ether; the aqueous layer is then decanted and extracted 4 times with 60 cm.³ of diethyl ether. The combined ether layers are washed with 3 times 100 cm.³ of a 20% solution of sodium chloride and are then dried over magnesium sulphate, filtered and concentrated. 9.8 g. of crude product are obtained in which 7.85 g. of a product which, in U.V. spectrography of a solution in ethanol, gives an absorption maximum at 294 nm.

$$\left(E_{1cm}^{1\%} = 190\right)$$

and another at 254 nm.

$$\left(E_{1cm}^{1\%} = 185\right)$$

and which corresponds to the formula:

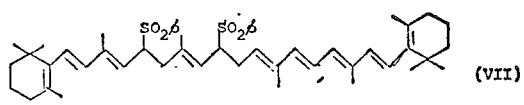 (VII)

are measured.

Yield: 95.6%.

The disulphone employed in the reaction was prepared by reacting phenyl-5-(2,6,6-trimethyl-cyclohex-1-enyl)-3-methyl-penta-2,4-dienyl-sulphone (whose preparation is described in Example 1) with phenyl-4-chloro-3-methyl-but-2-enyl-sulphone in the presence of an alkali metal t-butylate, in a tetrahydrofuran medium and at —30° C. The disulphone and the process for preparing it are described and claimed in U.S. Ser. No. 328,537 filed Feb. 1, 1972 in the name of the present Applicants.

Phenyl-4-chloro-3-methyl-but-2-enyl-sulphone was prepared by reacting sodium phenylsulphonate with 1,4-dichloro-2-methyl-2-butene, in equimolecular amounts, in anhydrous ethanol and at 38°–40° C. It is a white solid product, of melting point 88° C.

The solution of retinyl chloride, as it is used, was obtained by reacting 2.85 g. of 3-retinol dissolved in 10 cm.³ of diethyl ether with 0.3 cm.³ of phosphorus trichloride dissolved in 3 cm.³ of diethyl ether, the temperature being kept at —30° C. and the duration of the reaction being 2 hours.

(b) 3.62 g. of the disulphone (VII) obtained, 1.7 g. of potassium t-butylate and 25 cm.³ of anhydrous pyridine are introduced into a flask. The mixture is heated at 50° C. for 2 hours 30 minutes and then left to stand at 20° C. for 16 hours, and then neutralised to pH 6 by means of 2 N sulphuric acid. The pyridine is removed under the vacuum provided by a water-pump. The residue is taken up in 80 cm.³ of diethyl ether and 50 cm.³ of water. The aqueous layer is decanted and extracted with diethyl ether. The combined ether layers are dried over magnesium sulphate, filtered and concentrated. It is found, by U.V. spectrometry, that β-carotene has been produced.

EXAMPLE 6

3.44 g. of the $C_{15}$ phenyl-sulphone used in Example 1 are dissolved in 10 cm.³ of tetrahydrofuran and the solution is run into 12 cm.³ of tetrahydrofuran which contains 2.24 g. of potassium t-butylate and which has been cooled to −30° C. A solution of 0.347 g. of 1,4-dichloro-2-methyl-2-butene in 5 cm.³ of tetrahydrofuran is then run in over the course of 15 minutes. By carrying out a treatment identical to that of the preceding Examples, 3.9 g. of a product are isolated which contain 1.4 g. of the compound of the formula:

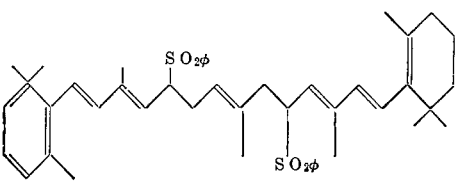

(VIII)

Yield: 73% relative to the dichlorinated product.

EXAMPLE 7

1.88 g. of potassium t-butylate and 3 cm.³ of tetrahydrofuran are introduced into a flask; the whole is cooled to −10° C. and a solution of 1.05 g. of phenyl-3-methyl-but-2-enyl-sulphone in 4 cm.³ of tetrahydrofuran is run in over the course of 2 minutes. A solution of 0.83 g. of isoprene hydrochloride in 2 cm.³ of tetrahydrofuran is then run in over the course of 4 minutes. The mixture is stirred for 1 hour 15 minutes at −10° C. and then for 1 hour at 0° C. and for 2 hours at 18° C. The reaction mixture is poured into a mixture of 25 cm.³ of water and 25 cm.³ of diethyl ether and the ether layers are treated in accordance with the preceding Examples. 1.38 g. of a pale yellow oily product, which corresponds to the formula:

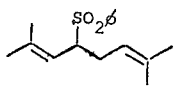

are obtained.

Yield: 99% relative to the sulphone employed.

EXAMPLE 8

A solution of 3.45 g. of phenyl-5-(2,6,6-trimethylcyclohex-1-enyl)-3-methyl-penta - 2,4 - dienylsulphone in 10 cm.³ of acetonitrile, followed by 0.2 g. of trimethyl-benzylammonium hydroxide (TRITON B) dissolved in 3 cm.³ of acetonitrile, are introduced into a 50 cm.³ three-necked flask equipped with a dropping funnel, a condenser and a nitrogen inlet. A solution of 2.1 g. of 1-phenylsulphonyl-2-methyl-butadiene in 50 cm.³ of acetonitrile is then run into the flask, over the course of 30 minutes. The reaction mixture is stirred for 2 hours at ambient temperature and then poured into a mixture of 200 cm.³ of water and 100 cm.³ of diethyl ether. The aqueous layer is decanted and extracted with 3 times 50 cm.³ of diethyl ether; the combined ether layers are washed with 3 times 100 cm.³ of water, dried over magnesium sulphate and concentrated. 5.55 g. of an oil are thus obtained, in which a product of the formula:

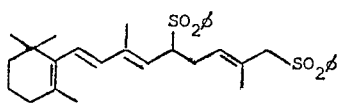

is identified and measured by infra-red spectrography, nuclear magnetic resonance and thin layer chromatography.

Degree of conversion 100%. Yield 68%.

Phenyl - 5 - (2,6,6-trimethyl-cyclohex-1-enyl)-3-methyl-penta-2,4-dienyl-sulphone was prepared by reacting sodium phenylsulphinate with 5-(2,6,6-trimethyl-cyclohex-1-enyl)-3-methyl-1-chloro-2,4-pentadiene as given in Example 1.

The preparation of 1-phenylsulphonyl-2-methyl-butadiene is described in the Journal of Organic Chemistry, 35, 4219 (1970).

We claim:

1. A sulphone corresponding to the general formula:

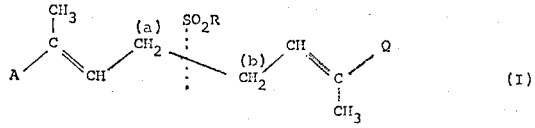

(I)

in which the sulphonyl group —SO₂R replaces a hydrogen atom on carbon atom (a) or (b), R represents an alkyl of 1 to 4 carbon atoms, phenyl, or alkylphenyl of 1 to 4 carbon atoms in the alkyl and A and Q, which may be the same or different, represent (a) a hydrocarbon radical containing 5n+1 carbon atoms (n being an integer of 1 to 5), which can contain a sulphonyl group and, when n is at least 2, can contain a 2,6,6-trimethyl-cyclohexenyl radical or such a radical substituted by =O or —OH; (b) a methyl radical, which is unsubstituted or substituted by a halogen or by a sulphide or sulphone group or (c) a primary alcohol group —CH₂OH, an ether thereof or an ester thereof with an inorganic or organic acid, with the proviso that Q and A are not both 6-(2,6,6-trimethyl-cyclohex-1-enyl)-4-methyl-hexa-1,3,5-trienyl radicals, and are not such that the compound of formula I contains a 1,5-dimethyl-3 or 4-sulphonyl-1,5-hexadienylene radical.

2. A sulphone according to claim 1 wherein the hydrocarbon radical represented by A or Q is a group having a carbon skeleton of formula:

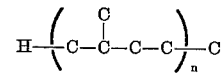

wherein n is 1 to 5, each $C_5$ unit containing 0 to 2 ethylenic double bonds, the remaining valencies being satisfied by hydrogen atoms, or two adjacent $C_5$ units are joined to form a structure containing a ring of 6 ring carbon atoms, which can be substituted by a hydroxy or oxo group, and the chain of $C_5$ units can have one substituent of formula SO₂R, wherein R is as defined in claim 1, in a grouping

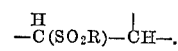

3. A sulphone according to claim 1 wherein R and $R_1$ represent phenyl radicals.

4. A sulphone according to claim 1 wherein A represents a 6-(2,6,6-trimethylcyclohex-1-enyl)-4-methyl-hexa-1,3,5-trienyl radical, or a 6-(2,6,6-trimethylcyclohex-1-enyl)-4-methyl-2-phenylsulphonyl-hexa-3,5-dienyl radical, a 2-(2,6,6-trimethylcyclohex-1-enyl)-ethenyl radical or a methyl radical.

5. A sulphone according to claim 1 wherein Q represents a methyl, halogenated methyl, arylsulphonyl methyl radical, an ether group from an alcoholic group —CH₂OH or a 6-(2,6,6-trimethylcyclohex-1-enyl)-4-methyl-hexa-1,3, 5-trienyl radical, a 6-(2,6,6-trimethylcyclohex-1-enyl)-4-methyl-2-phenylsulphonyl-hexa-3,5-dienyl radical, a 2-(2, 6,6-trimethylcyclohex-1-enyl)-ethenyl radical or a methyl radical.

6. A sulphone according to claim 1 wherein A represents a 2-(2,6,6-trimethyl-cyclohex-1-enyl)-ethenyl radical and Q represents a —CH₂OH group, an ester or ether group thereof, or a sulphone group of formula —CH₂SO₂R'.

7. A sulphone according to claim 4 wherein A represents a 6-(2,6,6-trimethylcyclohex-1-enyl)-4-methyl-hexa-1,3,5-trienyl radical and Q represents a —CH₂OH group, an ester or ether group thereof, or a sulphone group of formula —CH₂SO₂R'.

8. A sulphone according to claim 4 wherein A represents a 2-(2,6,6-trimethylcyclohex-1-enyl)-ethenyl or 6-(2,6,6-trimethyl - cyclohex - 1 - enyl)-4-methylhexa-1,3,5-trienyl radical and Q represents a polyene hydrocarbon radical of $5n+1$ carbon atoms, $n$ being an integer from 1 to 5, containing a 2,6,6-trimethyl-cyclohexene ring.

9. 9 - (2,6,6 - Trimethyl - cyclohex - 1 - enyl)-5-phenyl-sulphonyl-2,7-dimethyl-1-chloro-nona-2,6,8-triene.

10. 9-(2,6,6-Trimethyl-cyclohex-1-enyl)-2,7-dimethyl-1,5-bis-phenylsulphonyl-nona-2,6,8-triene.

11. 13 - (2,6,6 - Trimethyl - cyclohex-1-enyl)-5-phenyl-sulphonyl - 2,7,11 - trimethyl-1-chloro-trideca-2,6,8,10,12-pentaene.

12. 13 - (2,6,6 - Trimethyl - cyclohex-1-enyl)-5-phenyl-sulphonyl - 2,7,11-trimethyl-1-t-butoxy-trideca-2,6,8,10,12-pentaene.

13. 13 - (2,6,6-Trimethyl-cyclohex-1-enyl)-1,5-diphenyl-sulphonyl-2,7,11-trimethyl-trideca-2,6,8,10,12-pentaene.

14. 4-Phenylsulphonyl-2,7-dimethyl-octa-2,6-diene.

References Cited
UNITED STATES PATENTS 3,655,620   4/1972   Julia _____ 260—607 A LEWIS GOTTS, Primary Examiner D. R. PHILLIPS, Assistant Examiner U.S. Cl. X.R.

260—400, 465.1, 601 R, 666 C